Dec. 3, 1935.   C. A. HAWKINS   2,023,135
VEHICLE SUSPENSION
Filed Feb. 11, 1933    11 Sheets-Sheet 1

FIG.1.

INVENTOR.
Charles A. Hawkins
BY
*White, Prost, Fisher & Lothrop*
ATTORNEYS.

Dec. 3, 1935.  C. A. HAWKINS  2,023,135
VEHICLE SUSPENSION
Filed Feb. 11, 1933  11 Sheets-Sheet 4

INVENTOR.
Charles A. Hawkins
BY
White, Prost, Hebb Lothrop
ATTORNEYS.

Dec. 3, 1935.  C. A. HAWKINS  2,023,135
VEHICLE SUSPENSION
Filed Feb. 11, 1933   11 Sheets-Sheet 6

INVENTOR.
Charles A. Hawkins
BY White, Prest, Fletcher Lothrop
ATTORNEYS.

Dec. 3, 1935.  C. A. HAWKINS  2,023,135
VEHICLE SUSPENSION
Filed Feb. 11, 1933    11 Sheets-Sheet 8

INVENTOR.
Charles A. Hawkins
BY
White, Prost, Fisher & Lothrop
ATTORNEYS.

Dec. 3, 1935.  C. A. HAWKINS  2,023,135
VEHICLE SUSPENSION
Filed Feb. 11, 1933    11 Sheets-Sheet 9

FIG.16.

INVENTOR.
Charles A. Hawkins
BY
White, Prost, Hehr & Lothrop
ATTORNEYS.

Dec. 3, 1935.  C. A. HAWKINS  2,023,135
VEHICLE SUSPENSION
Filed Feb. 11, 1933  11 Sheets-Sheet 10

INVENTOR.
Charles A. Hawkins
BY
ATTORNEYS.

Dec. 3, 1935.  C. A. HAWKINS  2,023,135
VEHICLE SUSPENSION
Filed Feb. 11, 1933   11 Sheets-Sheet 11

INVENTOR.
Charles A. Hawkins
BY
ATTORNEYS.

Patented Dec. 3, 1935

2,023,135

UNITED STATES PATENT OFFICE 2,023,135

VEHICLE SUSPENSION

Charles A. Hawkins, San Francisco, Calif.

Application February 11, 1933, Serial No. 656,307

1 Claim. (Cl. 267—65)

This invention relates to the suspension for a vehicle and to a fluid suspension system capable of maintaining the vehicle frame in a desired position relative to the roadway by readjusting itself continuously to accommodate variations in loading and in the surface of the roadway.

In accordance with my present invention I provide an inter-connected fluid suspension system capable of adjusting the frame so that a load upon the vehicle is distributed substantially equally among the supporting wheels and so that, irrespective of the movement of the wheels, the frame occupies substantially the same position, under any given load, relative to the roadway being traversed.

It is an object of the invention to provide a vehicle suspension system capable of distributing the load upon the vehicle substantially equally to each of the wheels supporting the vehicle and which is inherently capable of adjusting itself so that the frame of the vehicle is maintained in a substantially predetermined planar position with respect to the roadway.

A further object of the invention is to devise a structure useful with a fluid vehicle-suspension system, capable of resiliently mounting the wheels upon the vehicle and of maintaining the frame in a substantially predetermined position with respect to the roadway.

The foregoing and other objects are attained in the embodiment of the invention shown in the drawings, in which.

Preferably, my invention comprises a vehicle suspension in which an interconnected fluid system is provided for mounting a plurality of wheels relative to a frame, so that the load upon the frame is distributed substantially equally upon all the wheels and so that the frame is inherently urged to maintain a predetermined planar position with respect to the roadway.

In the vehicle herein shown, I employ a frame 21 in which a source of motive power, such as an engine 22, is mounted. A plurality of wheels 23 are mounted for independent movement with respect to the frame. In the construction shown in Figures 1, 2 and 3, the wheels are carried upon arms 24 pivoted to the frame as at 26. Each of the arms 24 is carried upon a stub shaft 27 which extends from the frame and pivots on a bearing 28 interposed between the arm and the shaft. The arm is axially restrained by a plate 29 abutting the bearing 28 and secured to the shaft 27 by studs 31. A cover 32 extends over the plate 29 and engages the arm 24 to seal the bearing.

Figure 1:
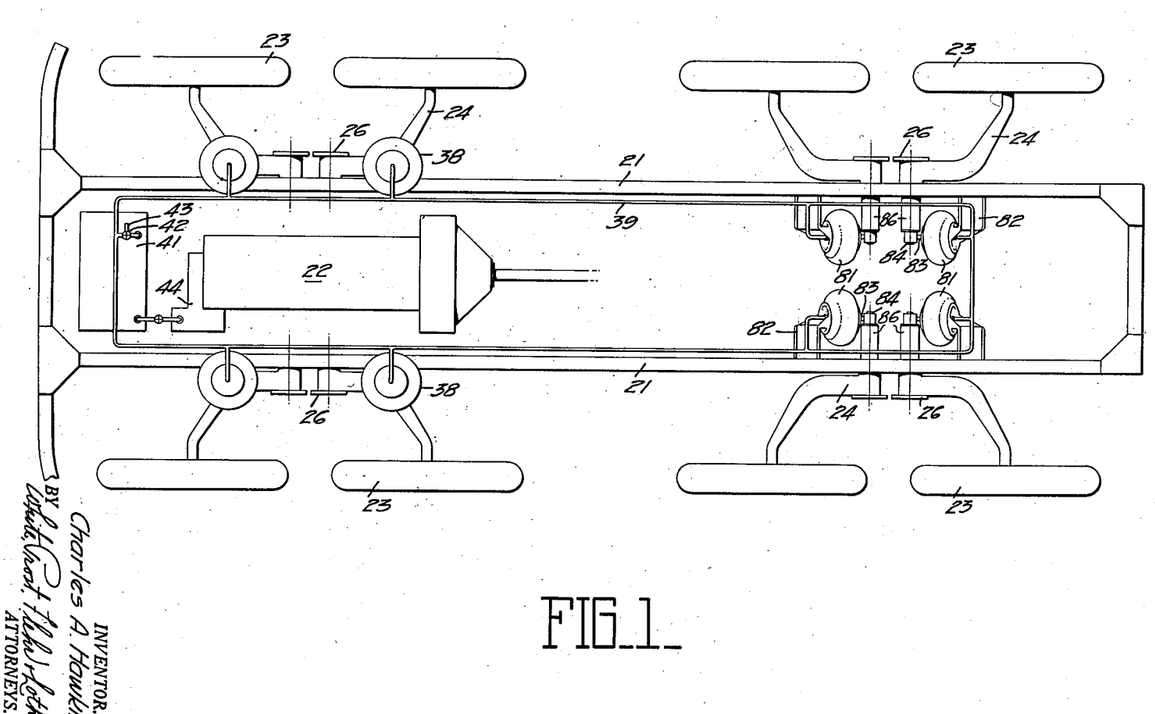
Figure 1 is a schematic plan of a vehicle illustrating my invention.
Figures 2, 3:
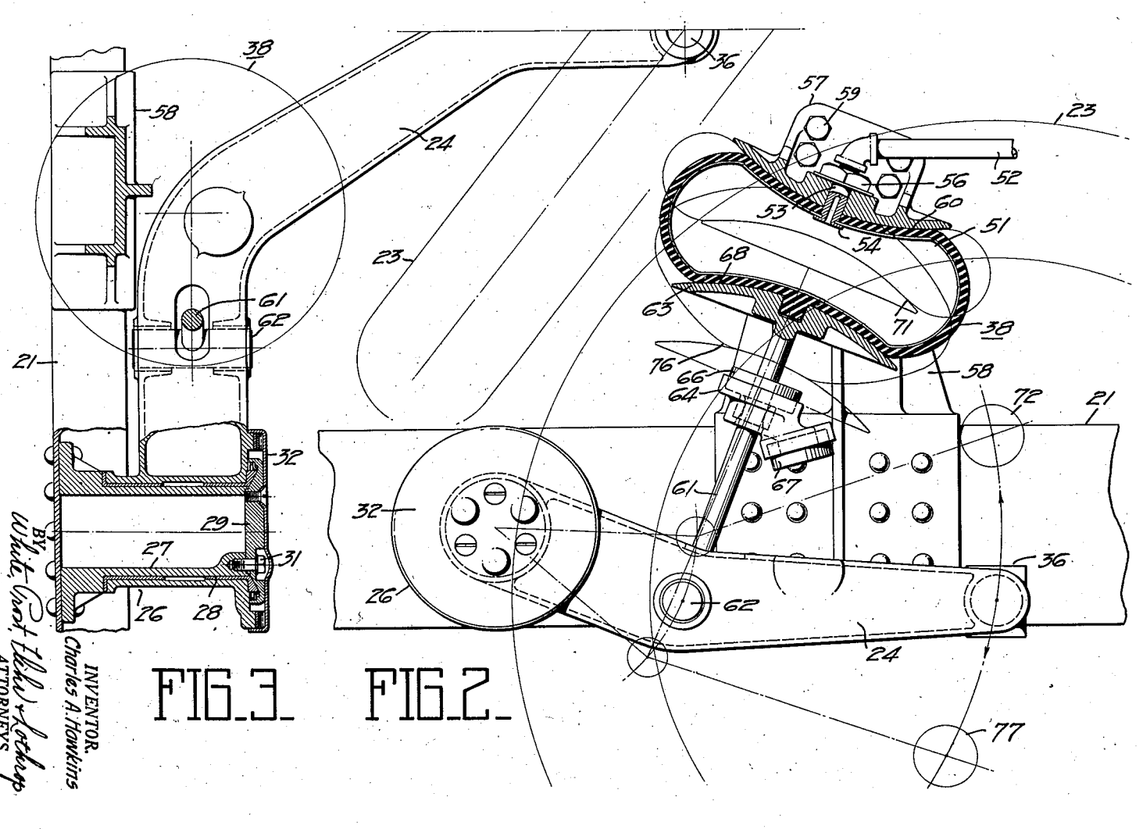
Figure 2 is a side elevation of a portion of the vehicle and being partly in section through a pneumatic suspension device.
Figure 3 is a plan view, partly in section, of a wheel mounting as shown in Figure 2.

The wheels 23 are rotatably carried at the outer ends of the arms 24 with or without the interposition of steering knuckles 36. Preferably all of the wheels or all but one or possibly two transverse pairs thereof are mounted for steering movement.

The arms 24 are mounted yieldably with respect to the frame by means of pressure devices 38 preferably interconnected and communicating through a pipe line 39 with a fluid reservoir 41. A three-way valve 42 can be operated to admit fluid to the interconnected system or to discharge fluid to the atmosphere through an exhaust 43. Fluid is supplied to the reservoir by a fluid pump 44 conveniently operated by the engine 22.

A form of pressure device 38 which operates in accordance with my invention is shown in Figure 2. This particular pressure device 51 receives fluid, preferably air, from the interconnected system through a conduit 52. The pressure device 51 is a container preferably of spherical contour when unflexed and is preferably constructed of such materials as fabric and rubber so that it is flexible, rugged and capable of deformation in accordance with working conditions. A tube 53 having a flange 54 seated within the device is held in place by a lock nut 56. A bracket 57 encompassing the tube is fastened to a support 58 mounted on the frame by studs 59.

In accordance with my invention the pressure device 51 is preferably confined between approximately spherical surfaces, such as the surface 60 of the bracket 57 and the surface 68 of a piston 63. The piston 63 is carried on a piston rod 61 pivoted to the arm 24 by a pin 62 and passing through an extension 64 upon the support 58. The extension 64 conveniently carries rubber pads 66 and 67, respectively, acting as stops upon extreme movement of the arm 24.

An increase in load upon the vehicle or approaching movement of the wheel 23 and frame 21 is effective to cause each of the suspension devices to be moved into a position such as that designated in Figure 2 by light lines 71. The container 51 is then in contact with the whole of the spherical faces 60 and 68 of the bracket and the piston respectively, the arm 24 occupying a position indicated by the lines 72. Upon a decrease in the load upon the vehicle, or receding movement of the wheel 23 and frame 21, the pressure device expands in corresponding amounts up to a maximum at the other extreme position indicated by the lines 76, the arm then occupying a position indicated by the lines 77. In this light load or expanded position but relatively small areas of the flexible pressure device are in contact with the faces of the piston and the supporting bracket.

Since the contacting areas change under variations in load and with movement of the arm with respect to the frame, in the present structure the total pressure and the unit pressure in the pneumatic devices do not bear a single, fixed relationship to each other. Consequently, the fluid is forced about the interconnected system to cause the pressure devices to work until the loads are equalized.

Figure 4:
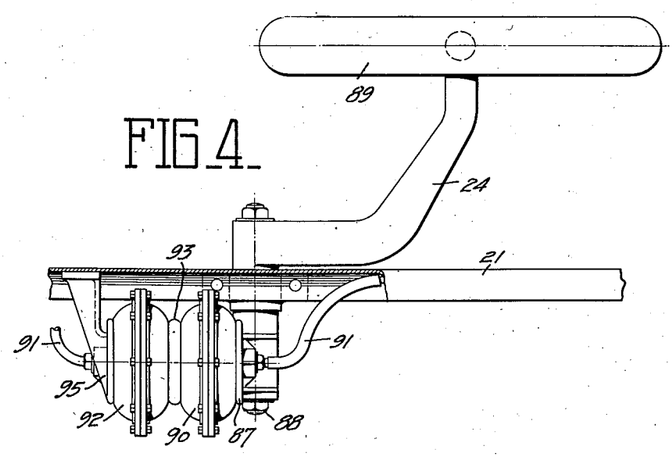
Figure 4 is a plan view of another form of wheel mounting.
Figures 5, 7:
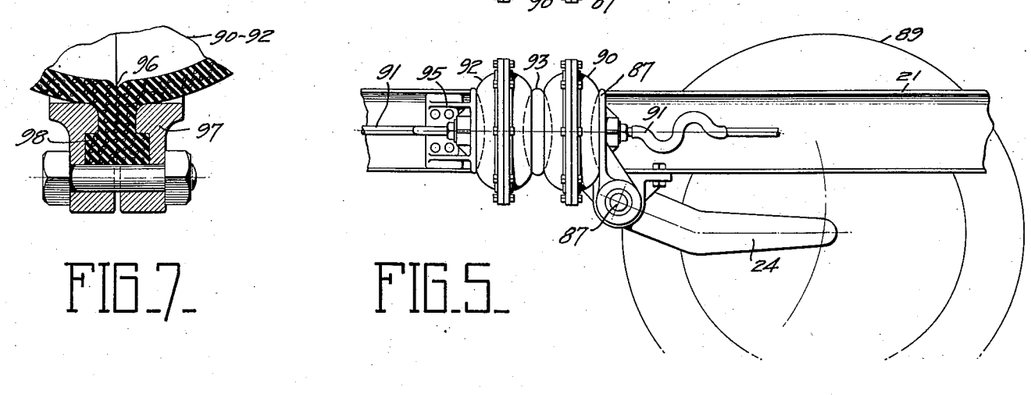
Figure 5 is a side elevation of the wheel mounting illustrated in Figure 4.
Figure 7 is an enlarged section through a portion of the structure shown in Figure 6.
Figure 6:
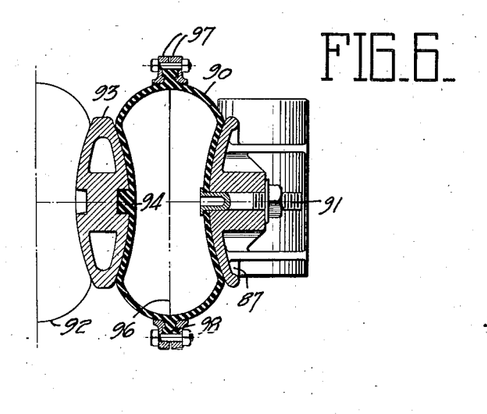
Figure 6 is a section through a portion of the wheel mounting shown in Figures 4 and 5.

While often the suspension devices are arranged identically throughout a vehicle, it is sometimes advisable to change the type of mounting at different locations. As illustrated in Figure 1, the devices 81 adjacent the rearward portion of the frame 21 are each carried on the inside of the frame by a bracket 82, and each abuts a lever 83 extending from a shaft 84 rotatably mounted in a bearing 86 on the frame and secured to the arm 24. A similar arrangement is shown in Figures 4, 5 and 6, but with a plurality of pressure devices to accommodate the system to extremely heavy loads. A spherically faced bracket 87 is secured to a shaft 88 rotatably mounted in the frame 21 and carrying an arm 24 upon which a wheel 89 is journalled for rotation and for rising and falling movement with respect to the frame. A pair of pressure devices 90 and 92 are placed in fluid communication with the interconnecting system by a flexible connection 91. The pressure devices are arranged in axial alignment and are spaced by an interposed lens-shaped body 93 retained in place by extensions 94 on the pressure devices, while a spherically faced bracket 95 secured to the frame acts as an abutment. With this arrangement, the proper number of devices may be assembled in parallel or in series or both to take care of the load, each additional device increasing the supporting area or increasing the deflection range, and thus increasing the load capacity of the vehicle.

The preferable formation of the pressure devices shown in Figure 4 is illustrated in Figures 6 and 7. Separate halves of the device are cemented or vulcanized together along their contiguous faces 96 and are additionally held together by flanged rings 97 which interengage an annularly grooved extension 98 to clamp the halves securely against leakage of the fluid.

Figure 8:
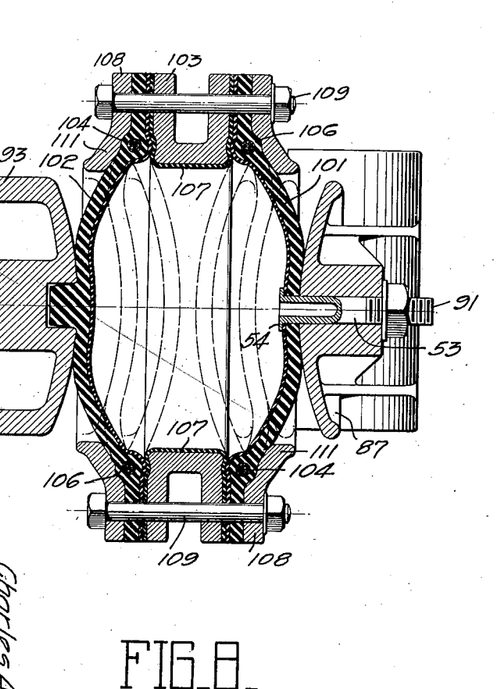
Figure 8 is a section through a modified form of pressure device.

In the modification shown in Figure 8, the pressure device is manufactured by extending flexible discs 101 and 102 formed of suitable material across a ring 103 U-shaped in cross section. The discs are each provided with annular reenforcing cords 104 which lie within circular ribs 106 facilitating compression of the discs against the ring 103. If desired, sheets 107 of rubber can be arranged as a lining on the surfaces of the ring 103 and the discs. Annular plates 108 are fastened to the ring 103 by bolts 109 to hold the assembly in position. The annular plates 108 are provided with arcuately formed portions 111 not only for engaging the ribs 106 but also for contacting the discs 101 and 102 in varying amounts, in accordance with the flexure of the discs, as is indicated by the dotted lines, to vary the free area of the discs and to move the region of flexure.

Figure 9:
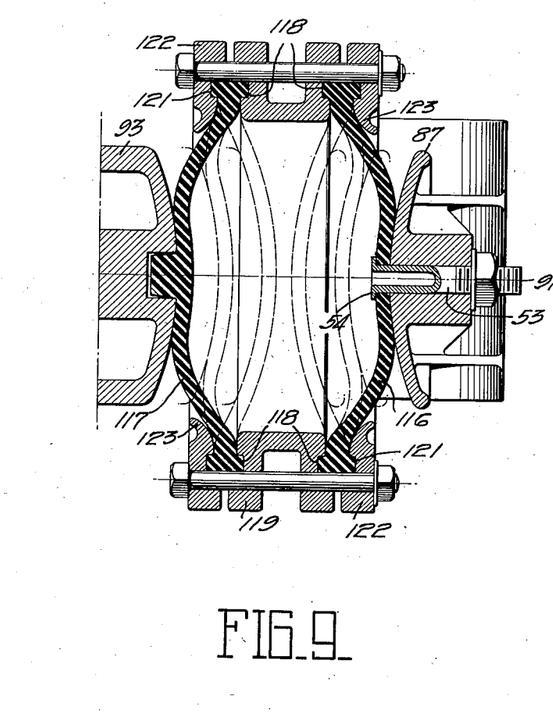
Figure 9 is a section through another form of fluid pressure device.

In the modification shown in Figure 9, flexible discs 116 and 117 are positioned between a block 93 and a movable bracket 87, and are retained in annular slots 118 provided in a ring 119 and in annular slots 121 provided in clamping collars 122. These collars are provided with curved extensions 123 adapted progressively to assume load from the discs as the pneumatic device expands and removes load from the block 93 and the bracket 87.

Figure 10:
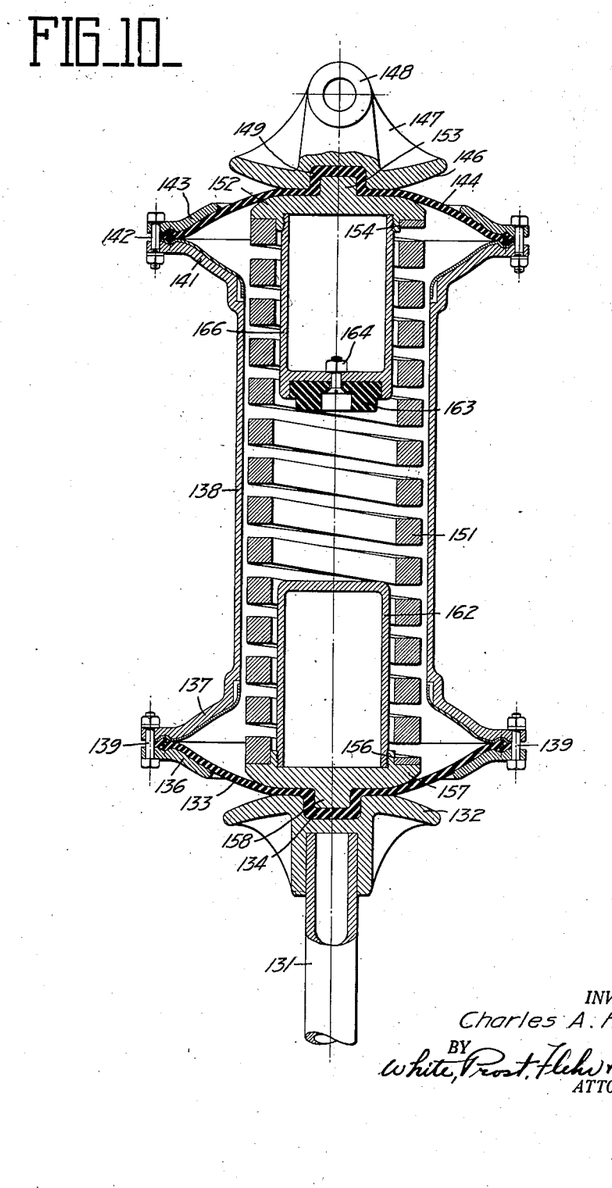
Figure 10 is a cross section on a diametral plane of a form of pneumatic suspension device incorporating a coil spring.

In the arrangement of Figure 10 there is provided a piston rod 131 at its end terminating in an enlarged spherically contoured head 132 which abuts a flexible diaphragm 133 having an extension 134 interfitting with a depression in the head 132. The diaphragm 133 is clamped between a suitably contoured plate 136 and a flanged extension 137 on the lower extremity of a cylindrical housing 138, preferably formed of metal or other suitable material, to which the plate 136 is secured by fastenings 139. The housing 138 at its opposite end is similarly flared to provide a suitably contoured flange 141 receiving fastenings 142 for holding a properly contoured annular plate 143 in position. A flexible diaphragm 144 is clamped between the plate 143 and the flange 141 and abuts a spherical surface 146 on a bracket 147 provided with an apertured boss 148 designed to be attached to the frame of the vehicle. A suitable extension 149 on the diaphragm 144 centralizes the diaphragm with respect to the bracket 147.

With the structure as so far described, the diaphragms 133 and 144 together with the cylindrical member 138 form an enclosed chamber designed to confine a pneumatic fluid. In addition to the pressure of the confined fluid which tends to space the bracket 147 and the piston rod 131, I preferably provide a coil spring 151 suitably housed by the cylindrical member 138 and at one end abutting a plate 152 having a central projection 153 adapted to seat within the extension 149 and be centralized thereby, and having likewise a peripheral groove 154 for positioning the spring 151. Similarly, the other end of the spring seats in a groove 156 peripherally formed on a plate 157 likewise provided with an extension 158 designed to seat within the depression 134. In order to limit the approaching movements of the bracket 147 and the piston rod 131, the plate 157 preferably carries an abutment 162 designed to contact a resilient button 163 held by a fastener 164 on a similar abutment 166 seated within the plate 152.

Figure 11:
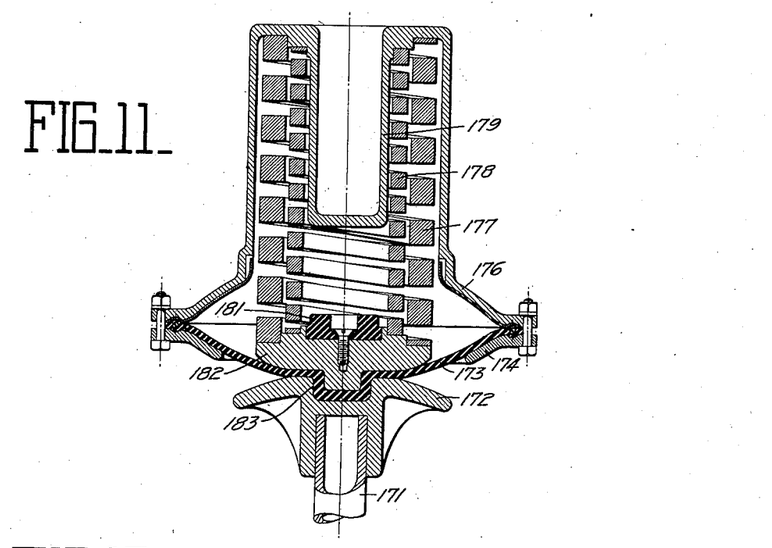
Figure 11 is a cross section of a modified form of suspension device incorporating springs.

In Figure 11, there is an arrangement in which a piston rod 171 carries a suitably contoured and recessed head 172 abutting a flexible diaphragm 173 clamped between an annular plate 174 and a cylindrical housing 176. The diaphragm and housing are designed to contain fluid under pressure to space the head 172 from the housing 176, which in turn can be fastened to a suitable support. Within the housing there is provided an outer coil spring 177 and an inner coil spring 178 preferably of different characteristics. Both of the springs surround a centrally extended abutment 179 preferably formed intergrally with the housing 176 and adapted to be contacted, upon extreme movement of the head 172, by a resilient bumper 181 forming part of a plate 182 designed to centralize the springs 177 and 178 and adapted to seat within a depression 183 in the head 172.

Figure 12:
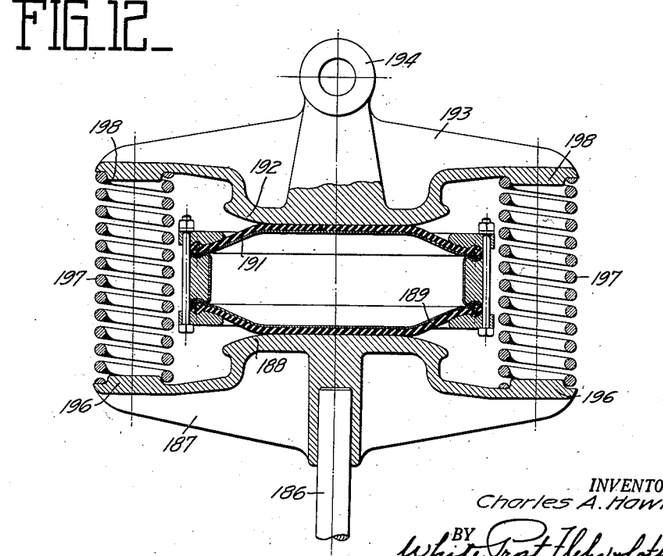
Figure 12 is a cross section of a form of pneumatic suspension device having external coil springs.

Under certain conditions it is desirable to remove the spring from the interior of the air containing housing, and in Figure 12 I show an arrangement accomplishing this purpose. This mechanism includes a piston rod 186 which is fastened to a head 187 provided with a central, generally spherical surface 188 adapted to contact a diaphragm 189 incorporated in a supporting device comparable to that shown in Figure 8. This device includes a second diaphragm 191 adapted to contact a generally spherical face 192 forming part of a bracket 193 having an apertured boss 194 or other suitable means for attachment to a support. The head 187 is provided with a plurality of bosses 196 adapted to act as positioning means for circumferentially arranged coil springs 197, which at their opposite ends engage comparable bosses 198 forming part of the head 193. With this arrangement the springs 197 being externally mounted can easily be removed or replaced.

Figure 13:
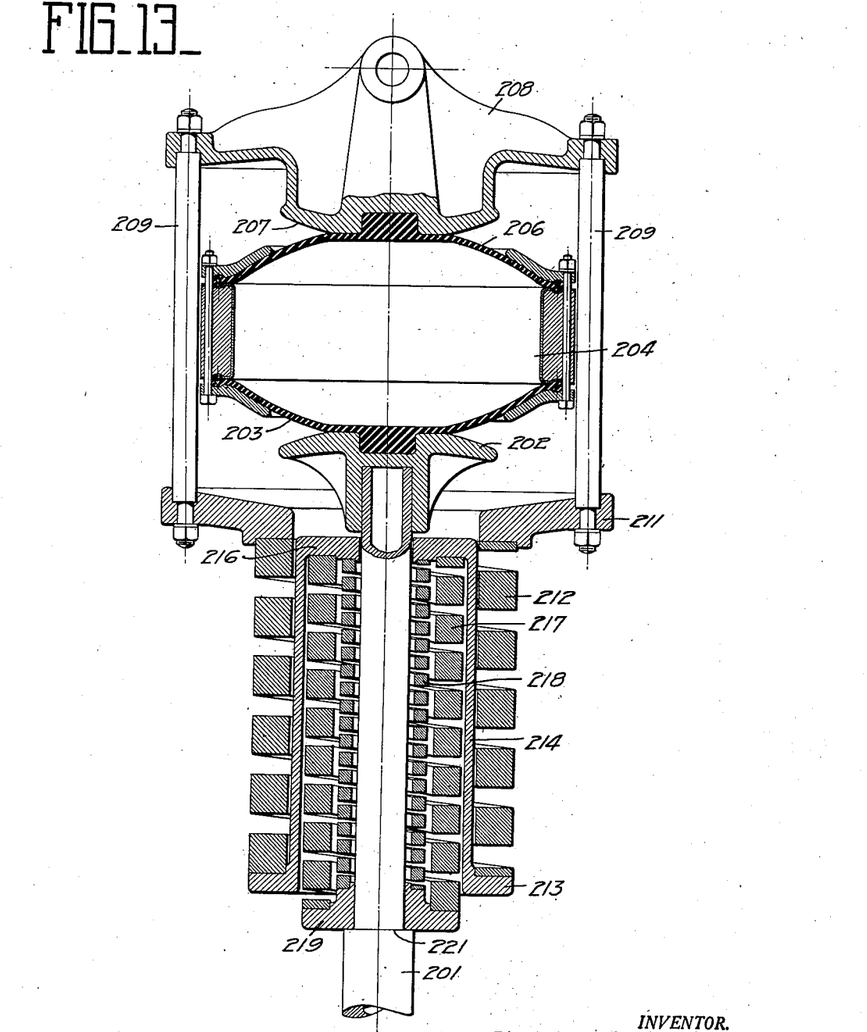
Figure 13 is a cross section similar to Figure 8 but having incorporated therewith external coil springs.

In Figure 13, there is shown another external spring mounting with the springs arranged concentrically with a piston rod 201. On its upper end, the rod 201 carries a suitably contoured head 202 abutting one of the diaphragms 203 of a pneumatic device 204 similar to that shown in Figure 8. The device 204 also incorporates a diaphragm 206 abutting a suitably contoured surface 207 forming part of an attachment bracket 208 designed to be secured to a suitable support. The bracket 208 provides a seating for rods 209, which not only act as guides for the pneumatic device 204, but also carry a plate 211 against which one end of an outer coil spring 212 abuts. The other end of the spring 212 is seated on a peripheral flange 213 integral with a cylindrical sleeve 214 which is provided at its opposite end with an inturned flange 216. This latter flange forms an abutment for a coil spring 217 which surrounds an inner coil spring 218 having different characteristics. The springs 217 and 218 likewise abut a washer 219 encompassing the piston rod 201 and seated against a shoulder 221 formed at a suitable point thereon. During relative movement between the piston rod 201 and the bracket 208 not only is the pneumatic device 204 variously compressed and expanded, but also the springs 212, 217 and 218 assist in assuming the load in varying amounts depending upon the deflection.

Figure 14:
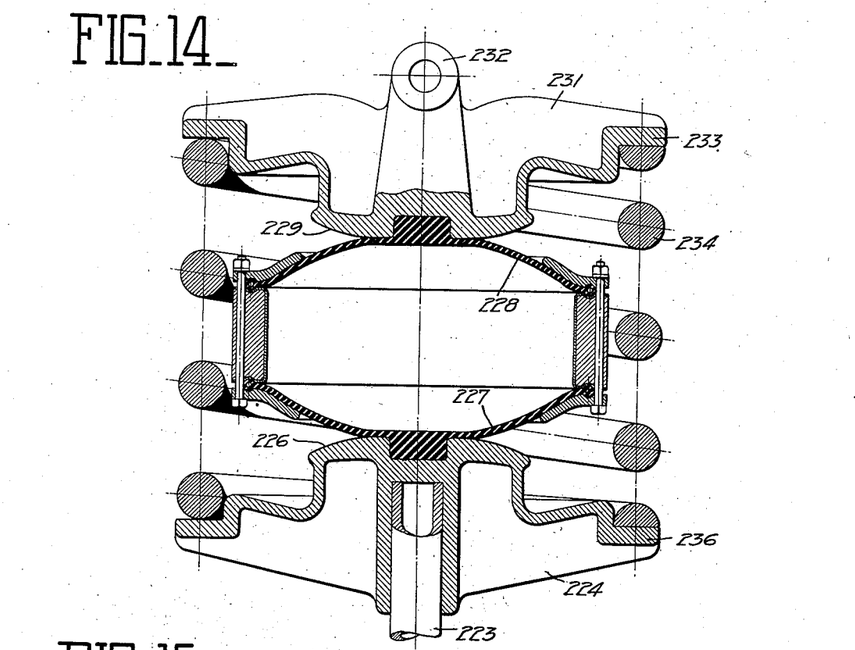
Figure 14 is a cross section of an additionally modified form of suspension device having a single external coil spring.

In Figure 14 there is disclosed a relatively simple arrangement incorporating a piston rod 223 which is fastened to a head 224. This head is provided with a suitably contoured surface 226 to abut a diaphragm 227 forming part of a pneumatic suspension device similar to that shown in Figure 8. This device likewise includes a diaphragm 228 abutting a suitably contoured surface 229 forming part of an attachment bracket 231 having an apertured boss 232 for fastening to any suitable support. The bracket 231 is formed with a peripheral flange 233 against which one end of a coil spring 234 abuts. The spring 234 is of sufficient diameter to encompass the pneumatic device and at its opposite end is seated on a peripheral flange 236 incorporated with the head 224.

Figure 15:
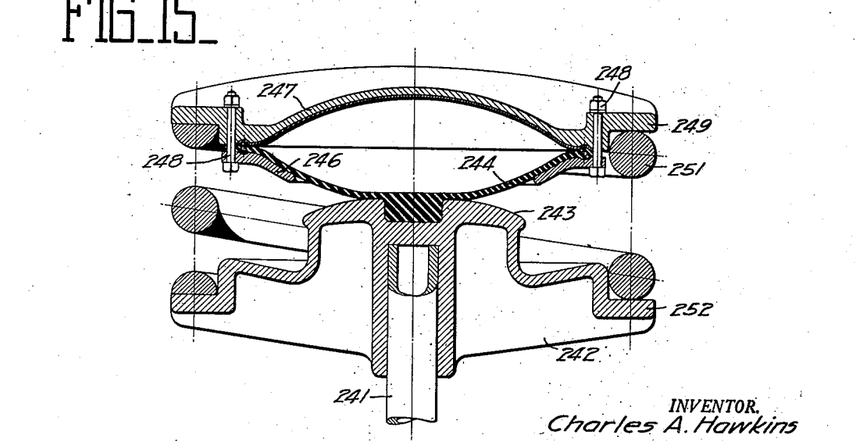
Figure 15 is a cross section of a pneumatic suspension device having an external coil spring and designed for relatively small deflections.

A further modification of this general scheme is shown in Figure 15, in which a piston rod 241 is secured to a head 242 having a spherical surface 243 thereon for abutment with a diaphragm 244. This diaphragm is clamped between a suitably contoured plate 246 and a supporting bracket 247 fastened to any proper support. The plate 246 is held on the bracket 247 with the diaphragm 244 interposed therebetween by suitable fastening means 248. The bracket is provided with a flange 249 against which a coil spring 251 of relatively large diameter seats, while the head 242 is provided with an oppositely facing flange 252 against which the spring 251 also seats. In the operation of this device, the deflection of the diaphragm 244 is accompanied by a corresponding deflection of the spring 251.

Figure 16:
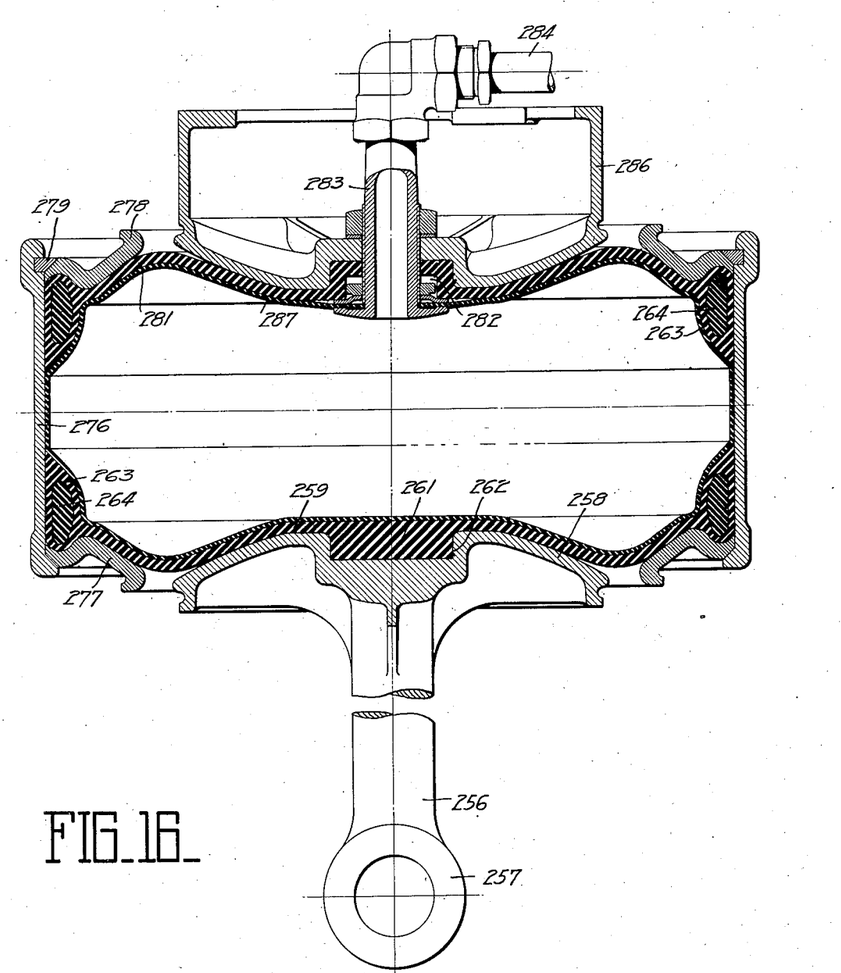
Figure 16 is a cross section on a diametral plane of an additionally modified form of suspension device without springs.

In Figure 16 there is disclosed a somewhat different type of suspension device which preferably includes a piston rod 256 at its lower end provided with an apertured boss 257 for connection to a suitable actuator, and at its upper end enlarged, as at 258, to form a suitably contoured surface. A diaphragm 259 of flexible material is designed to lie against more or less of the surface of the head 258 and to be centralized with respect thereto by means of a boss 261 projecting from the diaphragm and inter-engaging with a bore 262 in the head. Preferably the diaphragm 259 is terminated peripherally by an enlarged circumferential bead 263 suitably provided with reinforcing bands 264.

Figure 17:
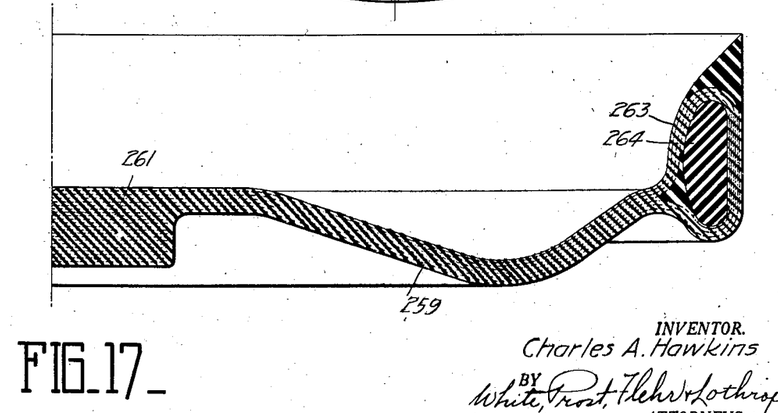
Figure 17 is an enlarged cross section of a portion of the mechanism shown in Figure 16.
Figure 18:
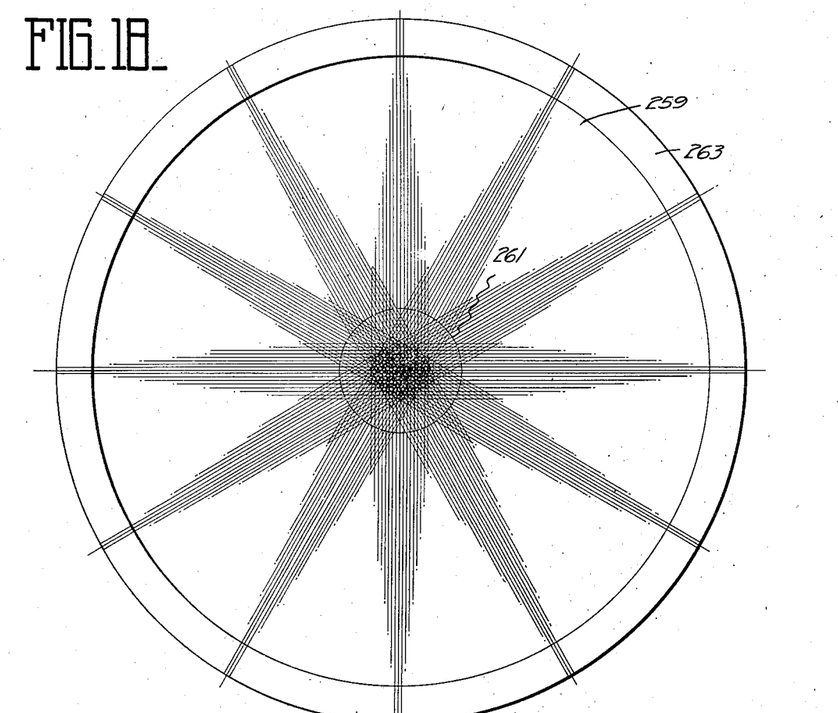
Figure 18 is a plan of a diaphragm disclosed in Figure 16, showing particularly the cord arrangement.

As especially shown in Figures 17 and 18, the diaphragm includes not only a flexible substance, such as rubber, as its binding constituent, but also includes a plurality of layers of fabric such as cotton cord. These layers of cord preferably overlap around the periphery of the diaphragm suitably to enclose the reinforcement 264. Often the fabric is made up of cloth having the warp and woof threads at right angles to each other, and preferably I employ six layers of such fabric with the warp threads, for instance, in successive layers rotated through 60° with respect to each other in order to provide a construction which resists forces in all directions.

Reverting now to the structure shown in Figure 16, the diaphragm 259 presses against a surrounding cylindrical housing 276 and is held in place thereon by means of an annular ring 277 similar to those utilized in conjunction with standard pneumatic tires. In the present instance, however, the locking ring 277 is suitably contoured with respect to the contour of the surface 258 to vary the zone of flexure of the diaphragm 259 and to assume contact with a portion of the diaphragm as the diaphragm leaves contact with the surface 258. The housing 276 is also provided with a second locking ring 278 similar to the locking ring 277, and with a snap ring 279 engaging the housing 276 in order firmly to hold the assembly in proper location.

Against the locking ring 278 a diaphragm 281 abuts. This diaphragm is similar to the diaphragm 259 with the exception that it is provided with a central aperture 282 for the reception of a suitable air conducting stem 283 joined to a conduit 284 incorporated in the intercommunicating pneumatic system. The stem 283 is clamped not only to the diaphragm 281 but also to a bracket 286 which forms the connection between the pneumatic device and the support therefor. Preferably the interior of the chamber formed by the diaphragms 259 and 281, together with the housing 276, is lined with an inner container or bag 287 preferably fabricated of relatively thin flexible rubber.

With this form of suspension device, the housing 276 "floats" and is moved half of the distance that the piston head 258 moves with respect to the bracket 286, so that both diaphragms are called upon for flexure in order to give a wide range of relative movement between the piston rod 256 and the bracket 286.

Figure 19:
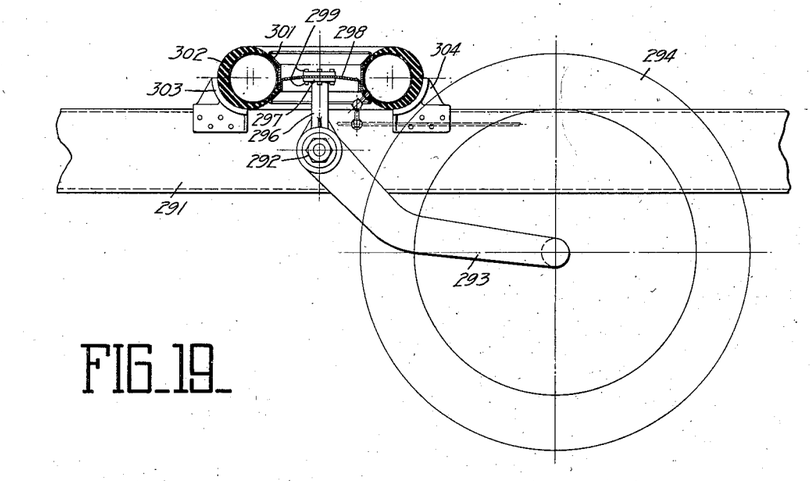
Figure 19 is a side elevation, portions being in section, of a pneumatic suspension device utilizing a standard tire.
Figure 20:
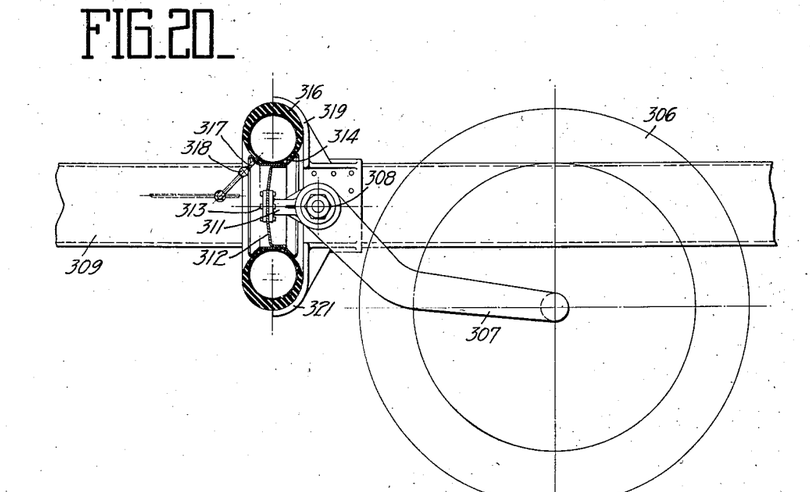
Figure 20 is a view similar to Figure 19 showing a side elevation with portions in section of a modified form of suspension device utilizing a standard tire.

In Figures 19 and 20 there are shown two forms of suspension device incorporating a standard automotive tire for the pneumatic suspension mechanism. In Figure 19, for instance there is disclosed a vehicle frame 291 carrying a stub shaft 292 on which an arm 293 is pivotally mounted. The arm carries a ground engaging wheel 294 for rotation with respect thereto, and, if desired, for steering movements with respect thereto. Rising and falling movement of the wheel 294 is communicated to the arm 293 and causes it to rotate pivotally about the stub shaft 292. The arm 293 is formed with an extension 296 which at its end is enlarged as at 297 to form a standard mounting plate for the reception of a disc 298 which can be a standard disc wheel secured thereto by standard fastening means 299.

At its periphery the disc 298 is joined to a rim 301 preferably of standard construction which inter-engages with a tire 302 of a standard type ordinarily used on ground engaging wheels, and more especially of the type having a relatively large capacity for air under relatively low pressure. The tire 302 is confined with respect to the frame 291 by a bracket 303 projecting from the frame and having an appropriate arcuate contour for resisting movement of the tire bodily toward the left in Figure 19. Similarly, a bracket 304 is mounted on the frame 291 and resists bodily movement of the tire 302 in the opposite direction. Thus, for rising and falling movement of the ground engaging wheel 294 the extension 296 is moved similarly and transmits its movement through the disc 298 to the rim 301. Movement of the rim is absorbed by deflection of the standard tire 302, while the slight arcuate movement due to the pivotal fastening of the extension 296 is likewise absorbed in the flexibility of the tire 302.

A similar arrangement is disclosed in Figure 20, in which a ground engaging wheel 306 is fastened rotatably on one end of an arm 307 mounted pivotally, as at 308, on a frame 309. The arm carries an extension 311 fastened to a disc 312 by suitable means 313. A rim 314 peripherally surrounding the disc 312 carries a standard tire 316 equipped with a stem 317 for connection, as at 318, to a pneumatic intercommunicating system. A bracket 319 fastened to the frame extends partially over the tire 316 and resists movement thereof in an upward direction while a comparable bracket 321 also fastened to the frame 309 extends partially under the tire 316 and resists downward movement thereof.

I claim:

A vehicle suspension comprising a pneumatic device including an annular band having an interior cylindrical surface, a pair of flexible diaphragms abutting said interior surface of said band to enclose a chamber, means seated on said interior surface for retaining said diaphragms on said band, and a flexible air containing envelope disposed within said chamber.

CHARLES A. HAWKINS.